Figure 1:
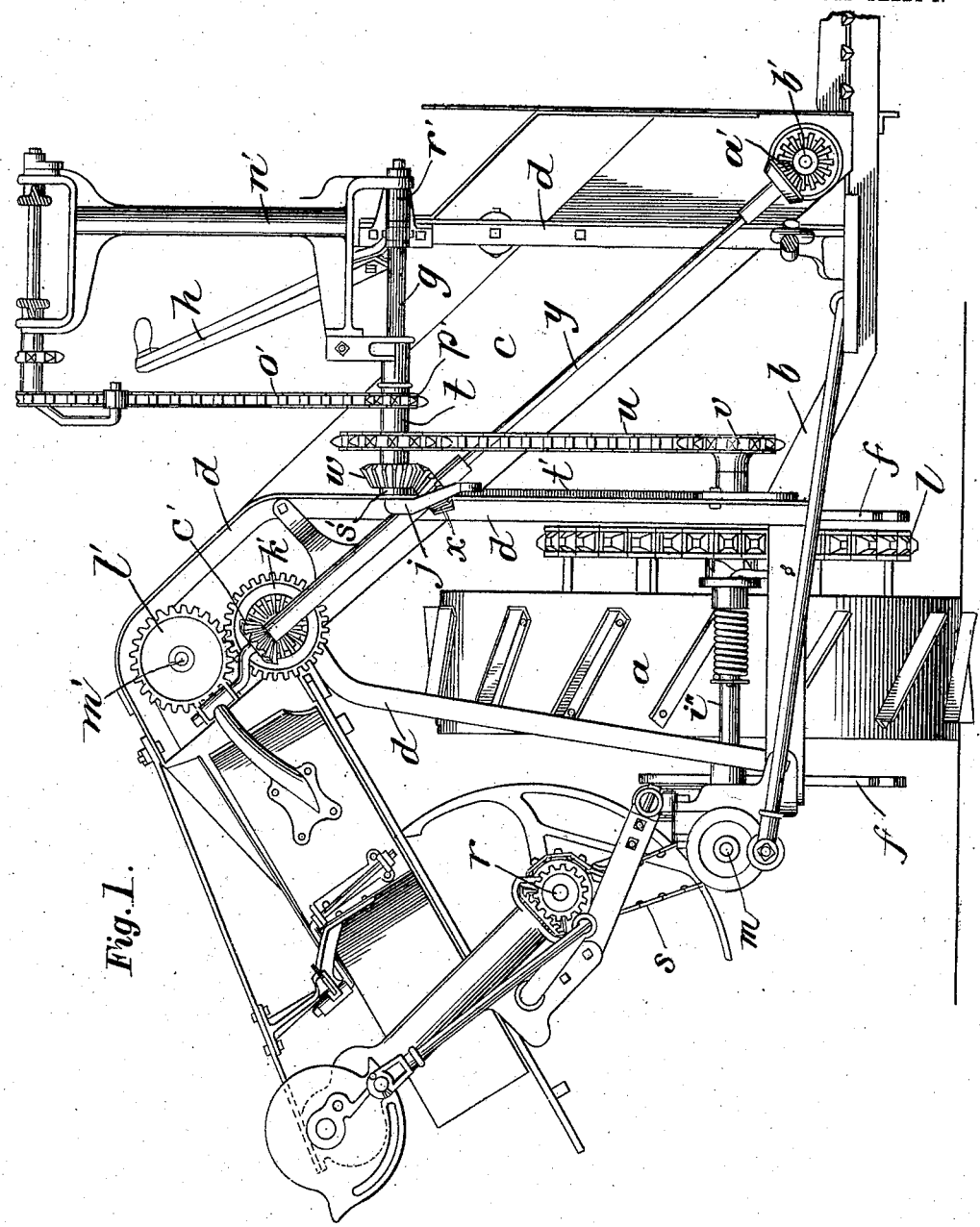

No. 845,873. PATENTED MAR. 5, 1907.
E. A. JOHNSTON.
HARVESTER.
APPLICATION FILED AUG. 17, 1906.

5 SHEETS—SHEET 1.

WITNESSES: INVENTOR:

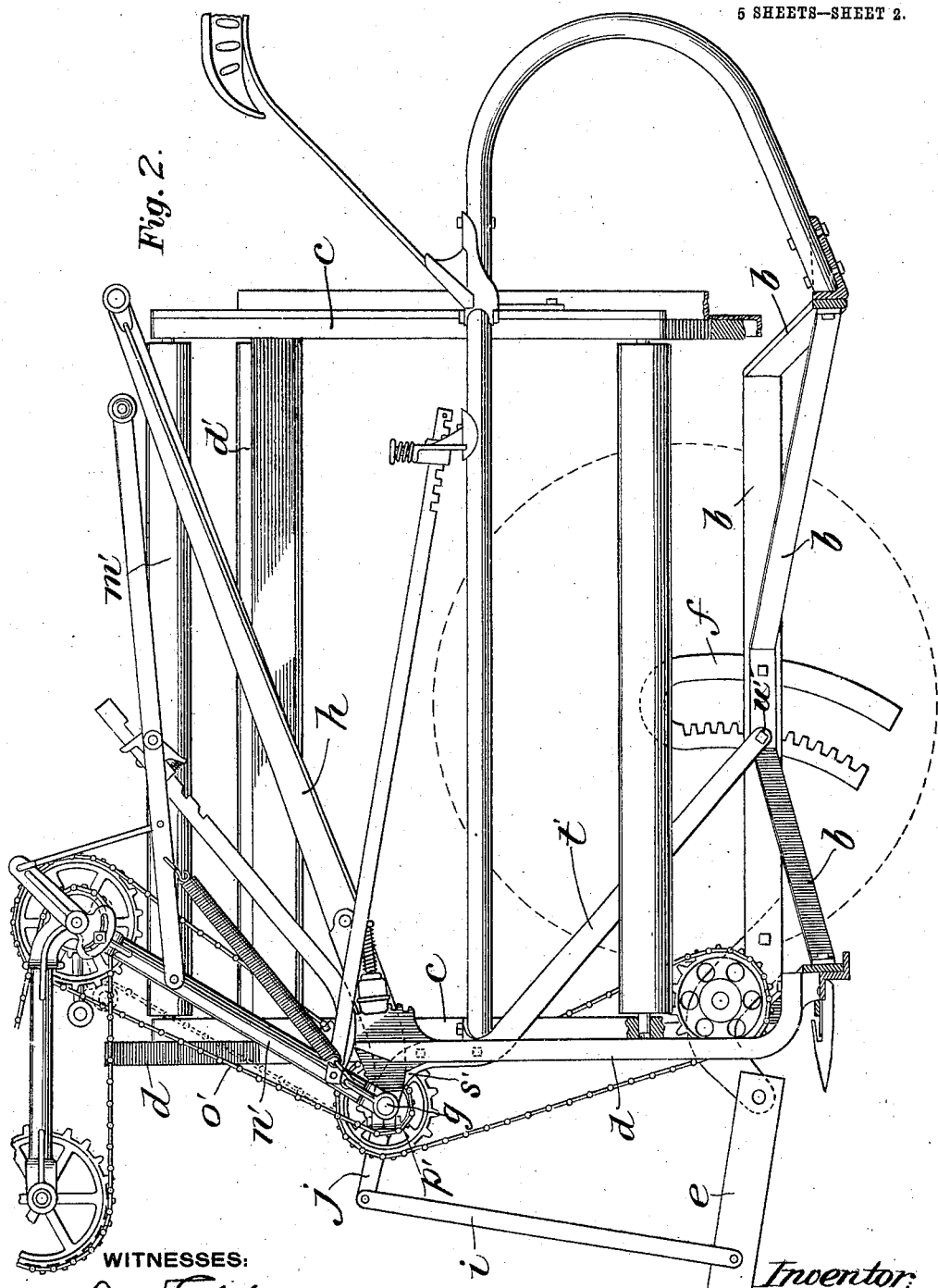

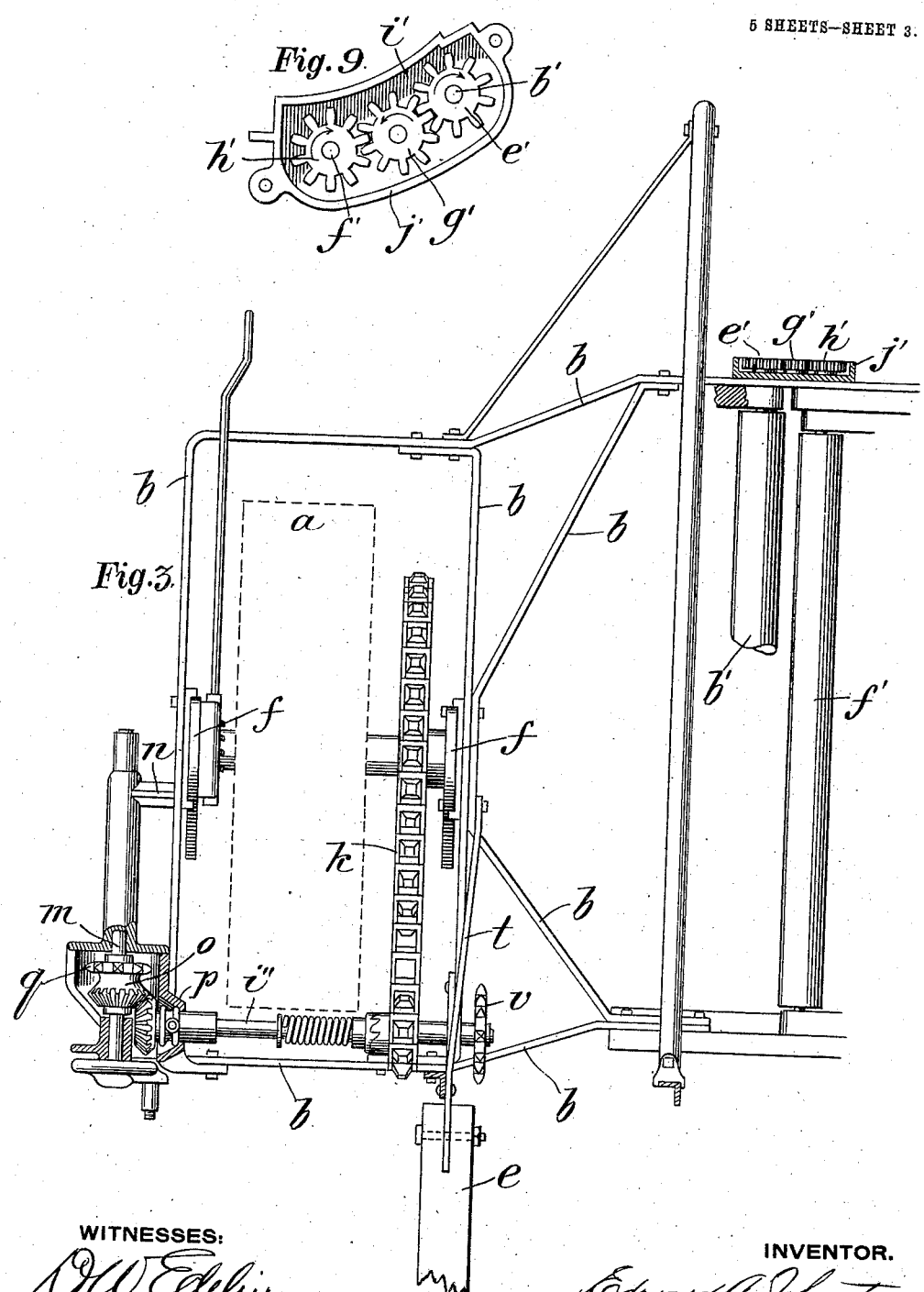

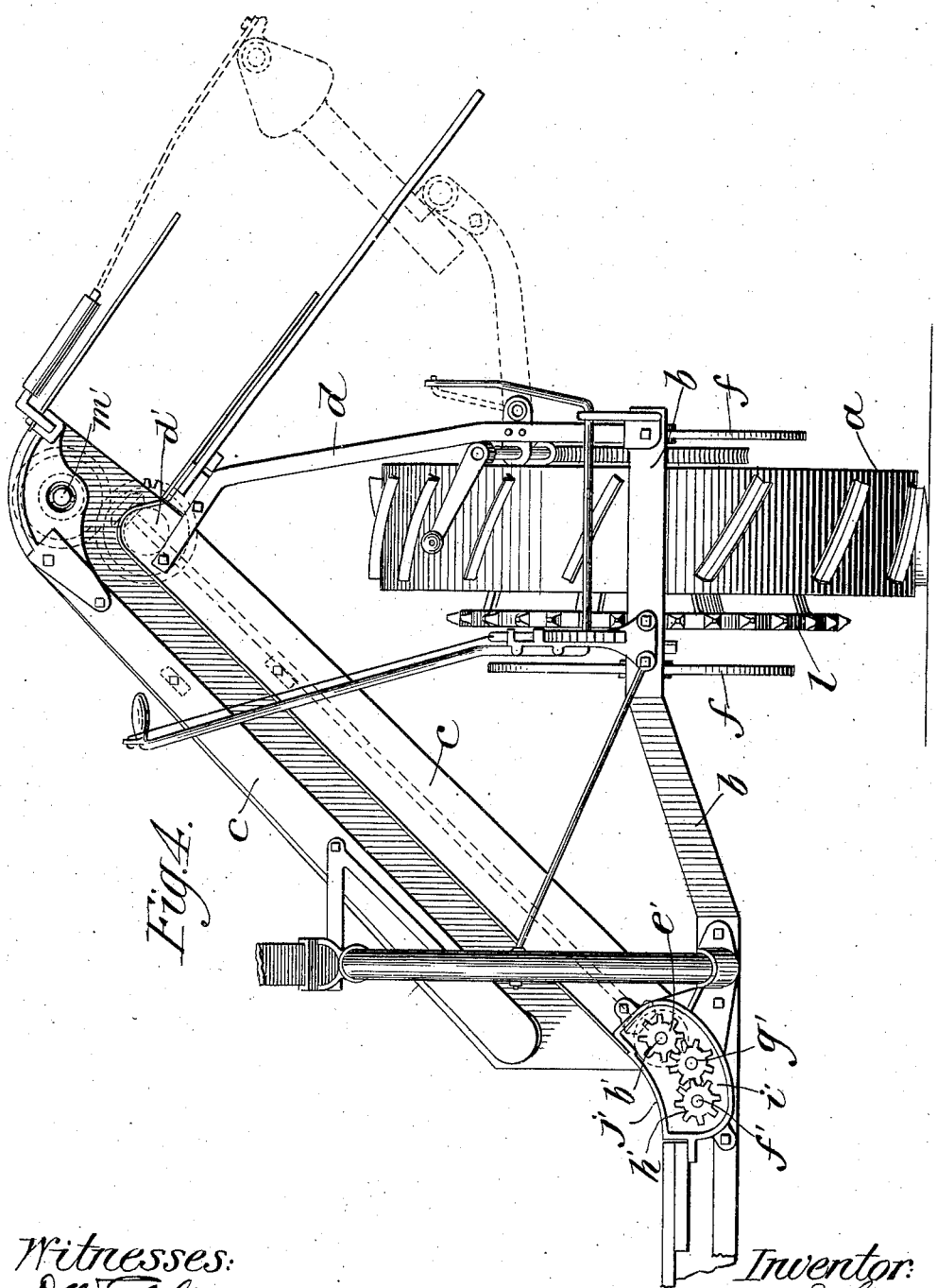

No. 845,873. PATENTED MAR. 5, 1907.
E. A. JOHNSTON.
HARVESTER.
APPLICATION FILED AUG. 17, 1906.
5 SHEETS—SHEET 5.
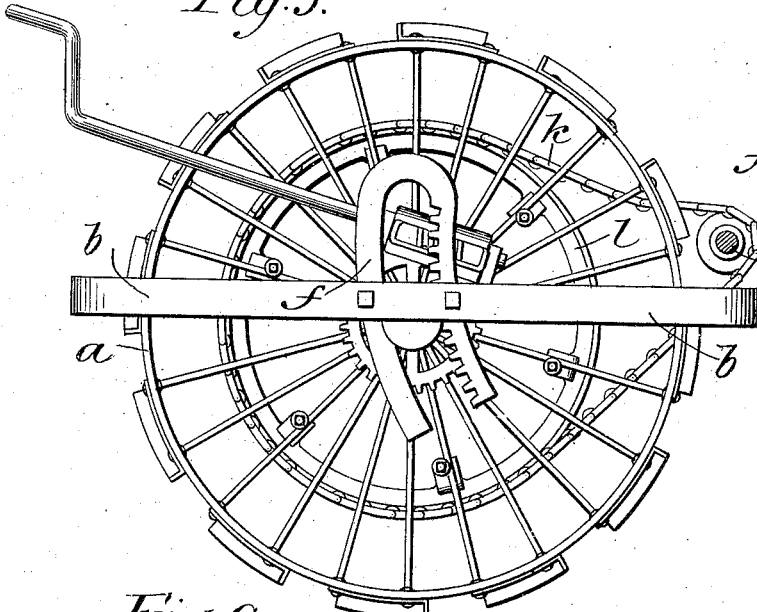
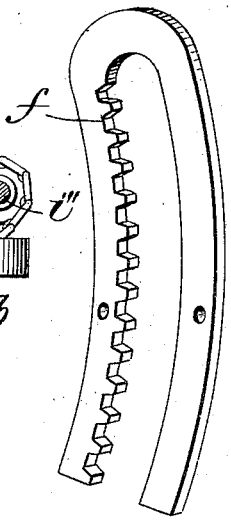
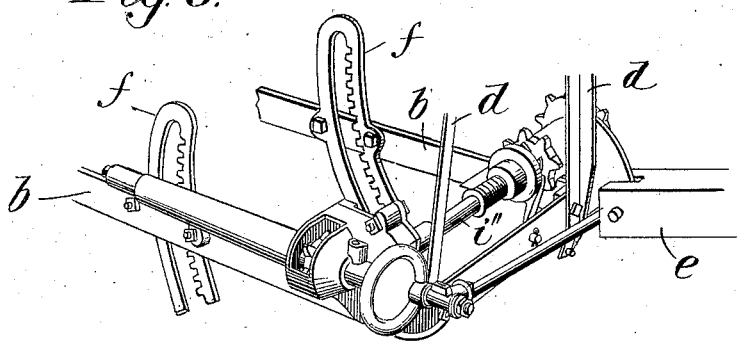
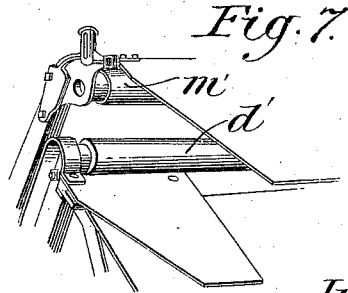

UNITED STATES PATENT OFFICE.

EDWARD A. JOHNSTON, OF STERLING, ILLINOIS.

HARVESTER.

No. 845,873. Specification of Letters Patent. Patented March 5, 1907.

Application filed August 17, 1906. Serial No. 331,024.

*To all whom it may concern:*

Be it known that I, EDWARD A. JOHNSTON, a citizen of the United States, residing at Sterling, county of Whiteside, State of Illinois, have invented certain new and useful Improvements in Harvesters; and I do hereby declare the following to be a full, clear, and exact description of the invention, such as will enable others skilled in the art to which it appertains to make and use the same.

The invention relates particularly, though not necessarily, to self-binding harvesters, and besides having the general object in view to enhance the lightness, strength, and efficiency of the machine as a whole includes certain improvements in various parts of the machine which will be explained in the following description, and particularly pointed out in the claims.

The invention is illustrated in the accompanying drawings, wherein—

Figure 1 is a front view, Fig. 2 a grain-side view, Fig. 3 a plan view, and Fig. 4 a rear view, of all of the machine except the grain-platform, only a portion of which is shown. Fig. 5 is a stubble-side view of the main supporting and driving wheel. Fig. 6 is a detail showing in perspective the arrangement of the counter-shaft, the crank-shaft, and the standards or racks for guiding the main wheel in its adjustments. Fig. 7 is a perspective detail showing the rear of the upper corner of the elevator. Fig. 8 is a perspective of one of the standards or racks above mentioned, and Fig. 9 is a detail of the gearing for driving the platform-canvas.

Referring to these views, $a$ denotes the main supporting and driving wheel, and $b$ wherever occurring indicates various parts of the machine-frame, which does not differ materially from the frames of other machines except as hereinafter described. The elevator $c$ is supported by standards $d$, rising from the main frame, and the tongue $e$ is pivotally connected to the frame in the usual manner.

The main wheel is adjusted vertically with respect to the machine-frame in the usual manner, being guided in its movements by standards $f$, that will be hereinafter more fully described, and the machine is tilted on the wheel by means of a crank-shaft $g$, that is mounted in bearings in the standards $d$ $d$ at the front side of the elevator about midway of its height, a tilting lever $h$ extending rearwardly from near one end of the shaft within reach of the driver in his seat and a link $i$ connecting the tongue to the crank $j$ at the other end of the shaft.

Instead of being located at the rear of the machine, as heretofore has generally been the arrangement, the counter-shaft $i''$ is journaled in bearings in the wheel-frame forward of the main wheel, as is best shown in Figs. 1 and 3, and is driven by a chain $k$ from the sprocket-gear $l$ on the wheel. Besides other advantages to be hereinafter enumerated this arrangement insures that the lower ply of the sprocket-chain shall be the taut side and the upper ply shall be slack, thus doing away with the necessity of a tightener for the chain and preventing the chain from carrying stalks, weeds, and other trash into the sprocket-pinion of the counter-shaft as the lower ply moves away from the counter-shaft instead of toward it.

The standards $f$—"yokes" or "bridles," as they are sometimes called—which guide the main wheel are, as usual, approximately curved on an arc struck from the counter-shaft as a center; but the location of this shaft forward of the wheel involves the curving of the standards in the reverse direction from the ordinary way. As normally the position of the main-wheel axle is in the lower part of the standards, when the machine is raised and tilted forward for high cutting or when it is raised for any other purpose its center of gravity is thrown backward instead of forward, as heretofore, thus taking the weight off the necks of the animals and preserving a better balance of the machine.

Power to drive all the moving parts of the machine is taken from the counter-shaft, as usual, and the location of this shaft forward of the main wheel enables the back of the machine to be left entirely free from chains and sprockets, as the gearing for driving the elevators, the binder, the reel, and the cutting apparatus is all located in front of the machine, as will be more fully described later on. This forward location of the counter-shaft also obviates the necessity of employing a long crank-shaft extending from front to rear, as has heretofore been done, and permits the employment of a short shaft $m$, which extends from a bearing at the forward outer corner of the wheel-frame rearward only about as far as the outer standard $f$, where it has its rear bearing $n$. The crank-shaft is intergeared with the counter-shaft by bevel-gears $o$ $p$ and has a sprocket-pinion $q$, by means of which the binder-shaft $r$ is driven by the sprocket-chain $s$, and it is particularly noticeable in this connection that the power which is taken from the crank-shaft—namely, that to drive the binder and the cutting apparatus—is taken from a point in immediate proximity to that where the power to drive the shaft is applied. It is also to be noted that the shortening of the shaft obviates the danger of binding in its bearings, which is due in machines having long shafts to the springing or buckling of the frame.

Upon the shaft $g$, above referred to, a sleeve $t$ is mounted near its cranked end, and a chain $u$ drives this sleeve from the sprocket-pinion $v$ on the grain end of the counter-shaft. The sleeve $t$ is intergeared by bevel-pinions $w$ $x$ with a shaft $y$, which is mounted in bearings at the front side of the elevator, extends lengthwise thereof, with a pinion $a'$ at its lower end meshing with a similar pinion on the roller $b'$ of the lower elevator-canvas. At its upper end the shaft $y$ has also a bevel-pinion $c'$, which meshes with a similar pinion on the upper roller $d'$ of its lower canvas, so that both rollers of the lower elevator-canvas are positively driven.

At its rear end the elevator-roller $b'$ has a spur-pinion $e'$, and this pinion drives the inner roller $f'$ of the platform-canvas by means of an idler $g'$, which connects the pinion $e'$ with a similar pinion $h'$ on the rear end of the platform-roller. These three pinions are the only gears on the rear side of the machine, and besides being located at a point where they are out of the way they are housed in a casting $i'$, which is bolted to the platform and elevator frames at opposite ends and has a peripheral flange $j'$, that extends out flush with the pinions and protects them from injury and the accumulation of straws, dirt, &c.

The upper roller $d'$ of the lower elevator-canvas has at its forward end a spur-pinion $k'$, that meshes with a similar pinion $l'$ on the corresponding end of the upper roller $m'$ of the upper elevator-canvas. The method of driving the rolls of the platform and elevator canvases is best illustrated in Figs. 1 and 3, and it is to be particularly noted in respect thereof that not only is the rear end of the elevator free from chains and gearing of any kind, but the upper elevator-canvas is of the same length as the lower one. Moreover, there being no sprocket-wheel at the rear end of the upper roll of the lower canvas there is no need of a forcing-roller at this point, and the grain is permitted to lie down flat on the roller throughout its length, there being nothing to hold the heads of the grain up at this point and retard their elevation.

Except in the manner in which it is mounted and driven, the reel forms no part of the present invention and is not fully illustrated. In Figs. 1 and 2, however, the reel jack or frame $n'$ is shown as pivoted on the crank-shaft $g$, by means of which the frame is tilted, and the reel is driven by a chain $o'$ from a sprocket-pinion $p'$ on the grain end of the sleeve $t$, which is carried by the crank-shaft $g$.

It will thus be noted that all the moving parts of the machine are driven by gearing that is located in front instead of in rear of the elevator, the power being delivered to the counter-shaft from the driving-sprocket on the main wheel and being distributed from one end of the counter-shaft to the reel and the rollers of the platform and elevator canvases and from the other end of the counter-shaft to the binder and the cutting apparatus, thus leaving the rear end of the machine entirely unobstructed, as before referred to.

The bearings for the crank-shaft $g$, as before described, are mounted in standards rising from the machine-frame. That at the stubble end of the shaft is denoted by $r'$ in Fig. 1 and is secured to the upper end of the grainward standard $d$. The bearing at the stubble end of the shaft is mounted in a gooseneck extension $s'$, that projects forwardly from a diagonally-extending brace $t'$, whose lower end is secured to the machine-frame at $u'$ and extends upwardly and forwardly and is secured to the stubbleward elevator-standard $d$ at the same elevation as the bearing $r'$ for the other end of the shaft.

Apart from their curvature the main wheel yokes or bridles $f$ have the further feature of advantage that instead of being made of malleable iron, as heretofore, they are formed out of pieces of bar-iron, which are bent into shape and have the teeth of their racks punched out.

Having thus described my invention, what I claim is—

1. In a harvester, the combination with the platform-rolls and the rolls of the upper and lower elevator-canvases, of gears on the front ends of the rolls of the lower elevator-canvas, a shaft journaled lengthwise along the front end of the elevator and geared to said gears, a gear on the rear end of the inner platform-roll, a gear on the corresponding end of the lower elevator-roll, an idler interposed between said two last-mentioned gears, a gear on the front end of the upper elevator-roll, and a gear on the corresponding end of the adjacent lower elevator-roll intermeshing with said upper elevator-roll gear.

2. In a harvester, the combination with the elevator having upper and lower canvases and the rolls thereof, of gears on the front ends of the lower canvas-rolls, a shaft lengthwise of the elevator and journaled at the front side thereof, gears on opposite ends of the shaft meshing with the gears of the lower canvas-rolls, and intermeshing gears on the front ends of the upper rolls of the two elevator-canvases, whereby the rear side of the elevator at its upper end is left open and unobstructed with gearing.

3. In a harvester, the combination with the elevator having upper and lower canvases and the rolls thereof, of gears on the front ends of its upper and lower rolls, a diagonal shaft lengthwise the elevator and journaled at the front side thereof, said shaft having gears at its opposite ends meshing with the gears of the canvas-rolls, a short shaft journaled in bearings about midway of the height of the elevator, a driven sleeve mounted on the short shaft, and gearing between the sleeve and the diagonal shaft.

4. In a harvester, the combination with the main wheel and cutting apparatus, of a sprocket-gear on the wheel, a counter-shaft in front of the wheel having a sprocket-pinion on its inner end, a chain for driving the counter-shaft from the sprocket-gear on the wheel, a crank-shaft geared to the outer end of the counter-shaft and extending rearward therefrom, and a pitman connecting the crank-shaft and the cutter-bar, said pitman operating in a plane in front of the counter-shaft and substantially parallel therewith.

5. In a harvester, the combination with the cutting apparatus, the platform and elevator canvases, the reel, and the binder, of a sprocket-gear on the main wheel, a counter-shaft journaled in front of the wheel, a crank-shaft geared to the counter-shaft and extending rearwardly therefrom, a pitman connecting the wrist of the crank-shaft with the cutter-bar, a sprocket-pinion on the grain end of the counter-shaft and connections therefrom for driving the reel, the platform and the elevator canvases, a sprocket-pinion on the crank-shaft and connections therefrom for driving the binder, a second sprocket-pinion on the counter-shaft, and a chain from the sprocket-gear on the main wheel to said second sprocket-pinion on the counter-shaft.

6. In a harvester, the combination with the platform and elevator canvases, and the binder, of a sprocket-gear on the inner side of the main wheel, a counter-shaft journaled in front of the wheel and having a sprocket-pinion, a chain from the sprocket-gear on the main wheel to the sprocket-pinion on the counter-shaft, a second sprocket-pinion on the grain end of the counter-shaft and connections for driving the reel, the platform and the elevator-rolls, a crank-shaft intergeared with the outer end of the counter-shaft and extending rearward therefrom, and a sprocket-pinion on the crank-shaft with connection for driving the binder.

7. In a harvester, the combination with the elevator having upper and lower canvases and rolls, of a sprocket-gear on the inner side of the main wheel, a counter-shaft journaled in front of the wheel, a sprocket-pinion on the counter-shaft, a chain from the sprocket-gear on the main wheel to the sprocket-pinion on the counter-shaft, gears on the front ends of the rolls of the lower elevator-canvas, a diagonal shaft lengthwise of the elevator and journaled at the front side thereof, said shaft having gears at its opposite ends meshing with the gears on said lower canvas-rolls, a short shaft journaled in bearings about midway the height of the elevator, a driven sleeve mounted on the short shaft, gearing between the sleeve and the diagonal shaft, a sprocket-pinion on the grain end of the counter-shaft, a sprocket-pinion on the short elevated shaft, and a chain from the pinion on the end of the counter-shaft to the pinion on the short shaft.

In testimony whereof I affix my signature in presence of two witnesses.

EDWARD A. JOHNSTON.

Witnesses:
O. J. PLATT,
E. R. THOMPSON.